Dec. 14, 1965  F. BLOETSCHER ETAL  3,224,000
COMMUNICATION SATELLITE AND METHOD FOR MAKING SAME
Filed March 18, 1963

INVENTORS.
FREDERICK BLOETSCHER
BY JAMES O. GIBSON
WILLIAM B. CROSS

ATTORNEY

United States Patent Office 3,224,000
Patented Dec. 14, 1965

3,224,000
COMMUNICATION SATELLITE AND METHOD FOR MAKING SAME
Frederick Bloetscher, Cuyahoga Falls, and James O. Gibson and William B. Cross, Akron, Ohio, assignors to Goodyear Aerospace Corporation, a corporation of Delaware
Filed Mar. 18, 1963, Ser. No. 265,891
5 Claims. (Cl. 343—18)

This invention relates to a passive, space inflated and rigidized communication satellite, and the method employed to make the satellite.

Heretofore it has been known that the present echo type passive radar reflector satellites are not rigid when in space, and, therefore, do not give consistent reflective qualities. Additionally echo type reflectors have been affected by solar pressure which greatly changes the orbital path of the satellite.

It is the general object of the invention to avoid and overcome the foregoing and other difficulties of and objections to prior art practices by the provision of a rigid, light weight, highly reflective satellite utilizing electrically reflective wires adhesively bonded or welded together to an inflatable bladder, and which is less affected by solar pressure.

Another object of the invention is to create a satellite having a wire mesh body and an inflating bladder which can be packaged small for transportation into space and which can then be expanded to spherical shape and to stretch the wires adhesively secured to the bladder beyond their elastic limit, but not to the breaking point.

Another object of the invention is to provide a satellite construction wherein the bladder used to form the satellite decomposes under the influence of the space environment leaving only the wire cage so that the satellite is little affected by solar pressure thereafter.

The aforesaid objects of the invention, and other objects which will become apparent as the description proceeds, are achieved by providing a wire mesh reinforced bladder that is easily packaged in a space vehicle, which bladder when ejected in space expands under internal pressure to its designed shape and thereby stretches the wires of the mesh beyond their elastic limit to hold the desired satellite shape with no memory of the bladder, and in which the bladder then decomposes under the influence of the space environment.

Figure 1:
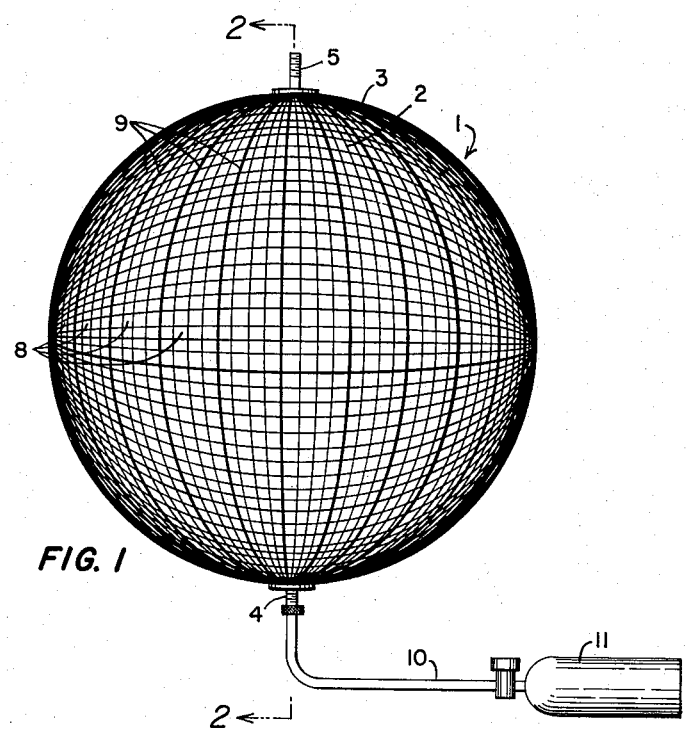
Figure 2:
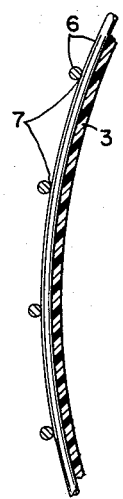
Figure 3:
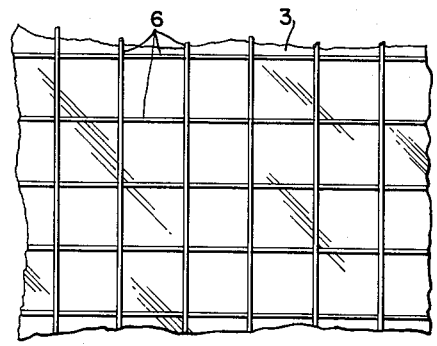

For a better understanding of the invention reference should be had to the accompanying drawings, wherein, FIGURE 1 is a front elevation of a spherically shaped reflective satellite incorporating the invention;

FIGURE 2 is an enlarged fragmentary cross sectional view of the surface of the satellite taken approximately on the line 2—2 of FIGURE 1; and FIGURE 3 is an enlarged fragmentary view of the outer surface of the satellite of FIGURE 1.

With specific reference to the form of the invention illustrated in the drawings, the numeral 1 indicates generally a radar and radio wave reflective satellite having a hollow spherical body formed from a wire mesh 2 adhesively secured to a bladder 3, and having top and bottom caps 5 and 4 respectively.

The wire mesh and inflatable bladder combination is, of course, the essence of the invention and its construction is best seen in FIGURE 2. Normally, the bladder 3 is about one half mil in thickness and is a special plastic type material which is photolytic, i.e., it decomposes under the influence of the space environment of low pressure, and infra-red and ultra-violet radiation. The bladder 3 may be of a film of the methacrylic ester polymer type. When these are prepared by free radical polymerization they have a chemical structure with identical initiating and terminal radicals. Polymers thus constituted will be flexible and optically clear, and their deployment can be by any of the conventional techniques, such as by melt or by solution. However, when exposed to ultra-violet light they decompose to monomer which departs by evaporation.

The wires 6 of the wire mesh are usually between about 1 and about 10 mils in diameter, dependent upon the size of the satellite. In a satellite with a diameter of several hundred feet the wires are about two mils in diameter, and can be made of any metallic wire that will as a mesh reflect radiant wave electrical energy, which metal can easily be drawn to a very small diameter, and which metal has an extended elongation range between the elastic limit and the breaking or ultimate strength value. Usually, however, an almost pure aluminum wire is used because of the added feature of lightness in weight for the rigidity provided.

There are several ways that the wire mesh 2 may be incorporated with the bladder 3. In one form, the wire mesh pattern is woven on top of the bladder material by a machine while an elongated flat strip of material is fed into the machine. The wire is adhesively secured to the bladder by a suitable adhesive, for example, by either coating the wires or the bladder before they are brought together. Also, the wires 6 of the mesh are adhesively secured or are brazed or welded to each other at their points of contact 7.

In another process, the mesh is formed first in flat elongated strips, and the bladder is formed separately in flat elongated strips with adhesive being used to secure the mesh and bladder together.

Another method is to form the wire mesh in flat elongated strips, and then dip it into a solution of the bladder material letting the holes remain filled with the bladder material by capillary attraction, and then allowing the so dipped mesh to dry forming the continuous mesh and bladder surface.

Normally, the spacing of the wires 6 in the wire mesh 2 is from about ⅛ inch apart to several inches apart, the distance depending upon the communication frequencies. It will be recognized that the more closely the mesh is spaced and/or the larger the wire diameter the more rigid is the satellite. Increasing the wire diameter increases the rigidity at a much faster rate than the weight increases and is the selected approach until limited by the wave frequency requirements. Preferably the spacing between the wires of the mesh is made less than the wave length of the high frequency waves to be reflected. Usually the spacing between the mesh is between about ¼ and ½₀ of the wave length to be reflected. In any event, the result is upon inflation of the spherical mesh in space with the attendant stretching and cold working of the wires that a very light yet sturdy satellite is produced.

In the spherical satellite as shown in FIGURE 1 the wire mesh and bladder are formed in a plurality of orange peel sections 8 in the same manner as a leather basketball, for example, which sections are held together at their edges 9 by overlapping or with bands bridging butt joints, all seams being coated with suitable adhesive means. The ends of the sections 8 all extend under the caps 4 and 5 and are adhesively secured thereto. Normally, the wire ends at the edges 9 of the sections 8 are brazed or welded to the wire ends in the adjacent sections thereby forming a complete and continuous wire mesh throughout the sphere. However, the adhesive bands holding the sections together may be of a type that does not decompose in a space environment, thereby holding the wire mesh sections together without welding, after the bladder 3 has decomposed in the space environment. It is noted that the welding of the wire ends or the holding by the adhesive bands will be strong enough to hold the wire ends together to allow proper stretching of the wires beyond their elastic limits when the satellite is inflated.

The preferred manner of inflating the satellite in space is to place inside the bladder during the building operation a quantity of inflating agents such as subliming powder or water. When in the vacuum of space the entrapped agents act to inflate the collapsed satellite to shape. Typically a subliming powder such as anthraquinone is employed and in a quantity to fill the volume when vaporized.

In an alternative but heavier arrangement an umbilical tube 10 may be built into one end of the bladder. If the bladder is to be inflated by external means, such as a compressed gas tank 11, the connecting tube is a flexible hose. If explosive inflating means are positioned internally of the bladder the tube is replaced by an electric lead for firing the internal inflating means upon the discharge of the satellite from the rocket carrier.

After the mesh and bladder combination is constructed and tested for air tightness, it is collapsed and carefully packaged and placed aboard a rocket as a pay load to be placed into orbit. When the package is released while on an orbital path internal pressure is applied, in a prescribed quantity, by any of the means heretofore described. This pressure is preferably in an amount to inflate the satellite to a greater size than that in which it was built, and enough to stretch the wires of the wire mesh beyond their elastic limit, but less than their breaking point, thereby permanently taking all kinks or bends out of the wire which may have resulted from the collapsing thereof and making the satellite rigid and assuring that it will retain its desired shape.

In a short time, the bladder will decompose leaving only the wire mesh reflector orbiting the earth. This reflector will, therefore, have much better reflective qualities, a longer orbital life, great rigidity, and will not be subject to solar pressure because its surface area has been so greatly decreased and because there is no gas internally of the satellite. It is also to be understood that the satellite can take a number of different shapes in order to perform the communication function desired more effectively.

If the satellite of the invention is inflated in space with an external tank or by an explosive charge a part of the inventive concept is to materially speed the decomposition of the bladder by incorporating with the inflating gas materials which will attack the bladder film but which will have little or no effect on the wire mesh. In this case the bladder film may be of the polyester type sold under the trademark "Mylar" by E. I. du Pont de Nemours & Company, of Wilmington, Delaware. The inflating gas may be carbon dioxide. Mixed with the $CO_2$ is about $\frac{1}{20}$ of an ounce of an amine hydrochloride for each cubic foot of unconfined gas. When this medium is used in space to inflate the bladder the desired inflating and wire stretching action is achieved very rapidly with the bladder remaining air tight, but after a few minutes the bladder begins to decompose and disappear under the action of the amine hydrochloride to thereby achieve the elimination of the bladder.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. A passive communications satellite comprising a spherical, fluid tight plastic bladder, a wire mesh adhesively secured to and completely covering the bladder, the mesh including a plurality of finely drawn ductile wires crisscrossing each other with a spacing less than the wave length of the communication signals to be reflected, said wires being secured to each other wherever they cross and are in contact, and the wires being in a stretched cold-worked state, fluid pressure means internally of the bladder, and means to decompose the bladder in a space environment.

2. A passive communications satellite comprising a fluid tight plastic bladder, a wire mesh adhesively secured to substantially and completely covering the bladder, the mesh including a plurality of finely drawn ductile wires crisscrossing each other, said wires being secured to each other wherever they cross and are in contact, and the wires being in a stretched cold-worked state, fluid pressure means internally of the bladder, and means to decompose the bladder in a space environment.

3. That method of providing a communications satellite in space which includes the steps of making a hollow wire mesh body on the earth, rendering the body fluid tight by closing the openings in the mesh, collapsing the body, transporting the collapsed body into orbit around the earth, inflating the body when in orbit with internal pressure in an amount to stretch the wires of the mesh beyond their elastic limit but not beyond their ultimate strength point, and opening the openings in the mesh so that there is no pressure differential between the inside and the outside of the body.

4. That method of providing a communications satellite in space which includes the steps of making a hollow wire mesh body on the earth, rendering the body fluid tight by closing the openings in the mesh, collapsing the body, transporting the collapsed body into orbit around the earth, and inflating the body when in orbit with internal pressure in an amount to stretch the majority of the wires of the mesh beyond their elastic limit but not beyond their ultimate strength.

5. That method of providing a communications satellite in space which includes the steps of making a hollow communication reflective mesh body on the earth, rendering the body fluid tight by closing the openings in the mesh, collapsing the body, transporting the collapsed body into orbit around the earth, inflating the body when in orbit with internal pressure, and opening the openings in the mesh so that there is no pressure differential between the inside and the outside of the body.

References Cited by the Examiner

UNITED STATES PATENTS

| | | |
|---|---|---|
| 2,455,469 | 12/1948 | Caspar. |
| 2,742,387 | 4/1956 | Giuliani _ _ _ _ _ _ _ _ _ _ _ _ 343—18 |

FOREIGN PATENTS

| | | |
|---|---|---|
| 439,608 | 12/1935 | Great Britain. |

CHESTER L. JUSTUS, *Primary Examiner.*

LEWIS H. MYERS, *Examiner.*